March 2, 1948.  H. LIVINGSTONE ET AL  2,437,106
GRINDING OR LIKE MACHINES

Filed Sept. 7, 1946

Inventors
H. Livingstone
W. E. Rogers
By Glascott Downing Tuckett
Attys.

Patented Mar. 2, 1948

2,437,106

UNITED STATES PATENT OFFICE 2,437,106

GRINDING OR LIKE MACHINES

Harry Livingstone, Longsight, Manchester, and William Edward Rogers, Timperley, Altrincham, England, assignors to Manchester Repetition Engineers Limited, Longsight, Manchester, England, a British company Application September 7, 1946, Serial No. 695,498
In Great Britain September 20, 1945

4 Claims. (Cl. 51—166)

This invention relates to machine tools, such as grinding, drilling, milling or turning machines, and has for its object to provide improved means for obtaining a circular movement of tool or work, e. g. for carrying out radius grinding or similar operations.

The arrangement according to the invention comprises a base which is fixed with respect to a machine tool, a slotted table rotatably mounted on the base, a lower slide arranged to slide in a fixed direction with respect to the base and having a central aperture, a top slide adapted to carry a tool or workpiece and arranged to slide on the lower slide in a direction at right angles to the direction of movement of the lower slide, and a driving pin having one end fixed in the slot of the table in an eccentric position adjustable with respect to the axis of the table and the other end journalled in the top slide, and passing through the aperture of the lower slide, so that rotation of the table produces a circular movement of the top slide.

The driving pin can be adjusted to any desired position in the slot in the table to vary the radius of the circle described by any point on the top slide, the maximum radius available being governed by the diameter of the aperture in the lower slide through which the pin projects.

Referring to the accompanying explanatory drawing.

Figure 1:
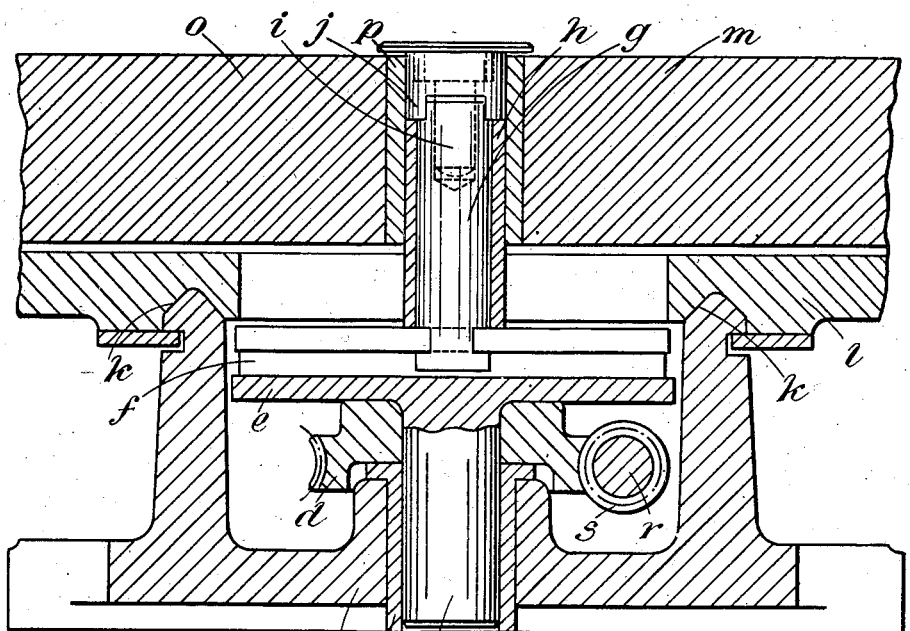
Figure 1 is a cross section through a device in accordance with the invention.
Figure 2:
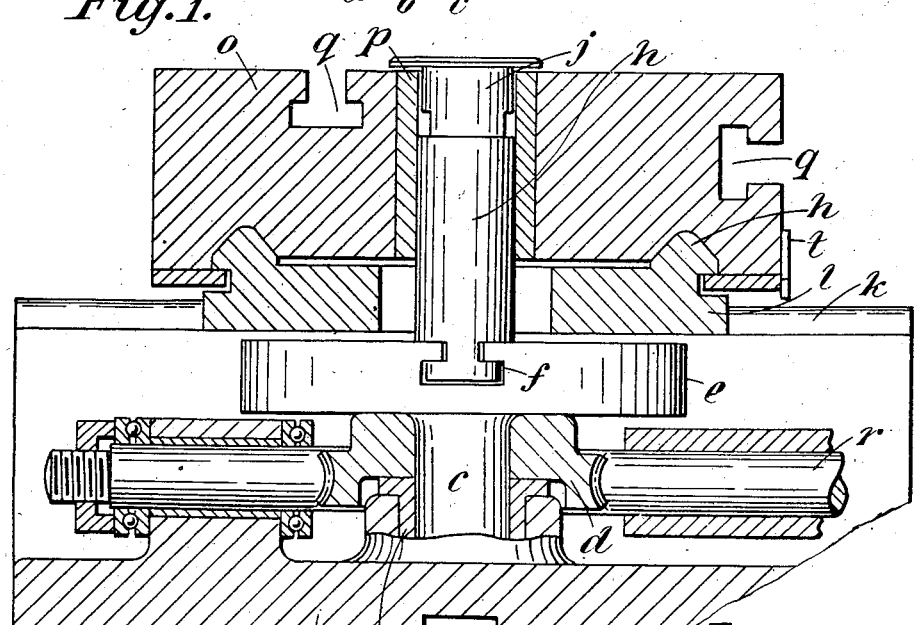
Figure 2 is a section in a direction at right angles to the section in Figure 1.

The base $a$ is incorporated in or secured to a machine tool. In a bearing $b$ on the base is mounted a spindle $c$ having a worm wheel $d$ splined thereto and carrying a table $e$. The table $e$ has a T-slot $f$ extending diametrically across it, which slot receives a T-head formed on a driving pin $g$. The pin $g$ is surrounded by a bush $h$ which serves to lock the pin in any desired position in the slot $f$, when forced against the table $e$ by means of a locking screw $i$ screwing into the top of the pin $g$, and a washer $j$.

Two guides $k$ formed on the base $a$ carry a lower slide $l$ which can travel on the guides in a straight line in a fixed direction with respect to the base $a$. The slide $l$ has a central aperture $m$ to allow free passage of the driving pin $g$.

On the slide $l$ are formed two guides $n$ extending at right angles to the guides $k$, on which guides a top slide $o$ is mounted, so that it can travel in a straight line with respect to the slide $k$. The bush $h$ surrounding the driving pin $g$ is journalled in a bush $p$ in the top slide $o$. The top slide $o$ has T-slots $q$ for mounting a tool or the work, for example—by means of centre blocks with T-headed bolts drawn into locking position by eccentric pins.

A spindle $r$ is journalled in the base $a$, which carries a hand wheel, not shown in the drawing, and a worm $s$ meshing with the worm wheel $d$.

When the table $e$ is rotated by turning the hand wheel on the worm spindle $r$, the driving pin $g$, fixed in the slot $f$ in an eccentric position, describes a circular path and imparts a circular motion to the top slide $o$. The lower slide $l$ reciprocates on the guides $k$ and the top slide $o$ reciprocates with respect to the lower side $l$ on the guides $n$. The aperture $m$ is sufficiently large to allow these movements to take place without the pin $g$ touching the slide $l$.

The slides are provided with vernier scales $t$ or the like to facilitate setting to the desired radius. By these means the desired radius movement of the tool or work is obtained without imparting greater movement to any part of the holder in any direction.

What we claim is:

1. Means for obtaining a circular movement of a tool or of a workpiece, comprising a base which is fixed with respect to a machine tool, a slotted table rotatably mounted on the base, a lower slide arranged to slide in a fixed direction with respect to the base and having a central aperture, a top slide adapted to carry a tool or workpiece and arranged to slide on the lower slide in a direction at right angles to the direction of movement of the lower slide, and a driving pin having one end fixed in the slot of the table in an eccentric position and adjustable with respect to the axis of the table and the other end journalled in the top slide, and passing through the aperture of the lower slide, so that rotation of the table produces a circular movement of the top slide.

2. Means as claimed in claim 1, in which the slotted table is carried by a spindle journalled in the base and carrying a worm wheel engaging with a worm which can be rotated by means of a hand wheel.

3. Means as claimed in claim 1, and having parallel guides on the base, on which the lower slide can move, and parallel guides on the lower slide at right angles to the guides on the base, on which the top slide can move with respect to the lower slide.

4. Means as claimed in claim 1, in which the table has a a T-slot and the driving pin has a T-head engaging in the slot, and means being provided for locking the pin in any desired position in the slot comprising a bush around the pin and abutting against the table and a screw threading into the top of the pin and bearing against the top of the bush through a washer.

HARRY LIVINGSTONE.
    WILLIAM EDWARD ROGERS.

REFERENCES CITED

The following references are of record in the file of this patent:

UNITED STATES PATENTS

| Number | Name | Date |
|---|---|---|
| 939,845 | Mattern | Nov. 9, 1909 |